Oct. 28, 1941.     E. S. BETTIS     2,260,823
IRRADIATING METHOD
Filed March 21, 1940
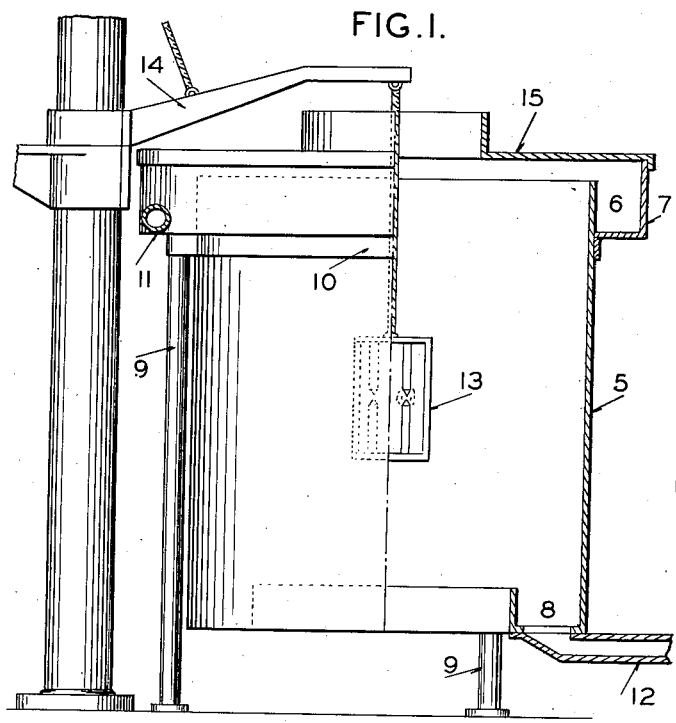
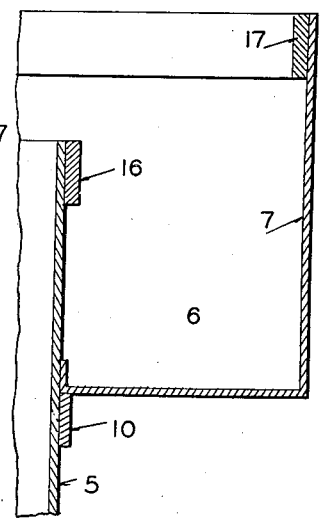
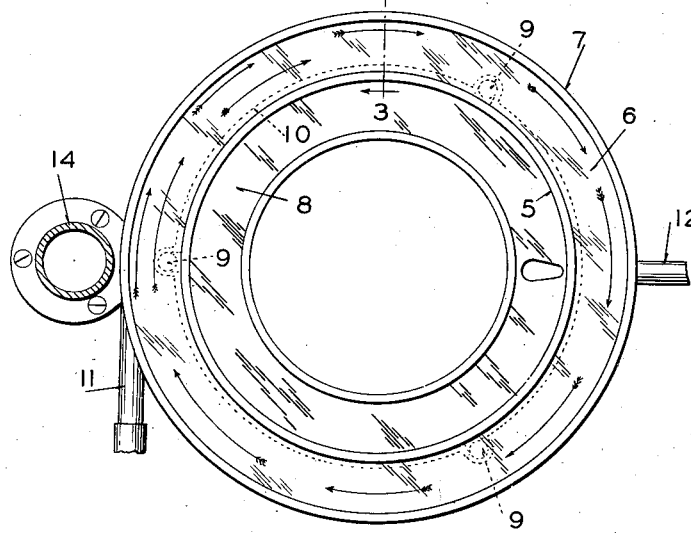
INVENTOR
EDWARD S. BETTIS
BY
ATTORNEY Patented Oct. 28, 1941

2,260,823

UNITED STATES PATENT OFFICE 2,260,823

IRRADIATING METHOD

Edward S. Bettis, Greenville, Ill., assignor to Pet Milk Company, St. Louis, Mo., a corporation of Delaware Application March 21, 1940, Serial No. 325,092

2 Claims. (Cl. 250—49)

My invention relates to a method for irradiating liquids to modify their character and more particularly to a method for treating milk with ultra-violet rays to increase its antirachitic content.

Ultra-violet rays have no appreciable penetration into milk, hence the antirachitic activation of provitamins therein is a purely surface phenomenon. In carrying out my invention I cause the milk to flow over a guiding surface in a thin film which is not smooth and even but which is agitated or turbulent so that a larger percentage of the total volume of milk is exposed to the action of the rays than when a vertical or weir flow is employed.

In the accompanying drawing which illustrates the preferred form of apparatus by means of which my method may be carried out, Figure 1 is a side view, partly in elevation and partly in section; Figure 2 is a top plan view, the cover being removed; Figure 3 is an enlarged section taken on the line 3—3 of Figure 2; and Figure 4 is an explanatory diagram of the film flow.

The form of apparatus shown comprises a shell 5, the inner face of which forms a vertical cylindrical guiding surface over which a thin film of the milk or other liquid to be treated, flows during the time it is exposed to the selected radiations. The top end of the shell is provided with an external annular distributing trough 6, the outer wall 7 of which extends above the inner wall. The latter is formed by the upper part of the shell 5. The lower end of the shell is provided with an internal collecting trough 8. The shell is supported by legs 9, secured to it by a clamping ring 10.

The milk is fed to the distributing trough through a supply pipe 11 which enters tangentially to the outer wall 7. The milk is delivered at sufficient velocity to produce a rotary motion to the entire contents of the trough as indicated by the arrows in Figure 2. After the trough is full its contents overflow the inner wall and pass down in a thin film over the inner face of the shell to the collecting trough 8 from which they are drawn off through the discharge pipe 12. The flow of the film of milk results from two angularly related components of velocity. The first due to the circular motion of the milk in the distributing trough is indicated by the arrow A (Figure 4). The second due to gravity is in a vertical direction as indicative by the arrow B. Consequently the milk does not travel in a vertical direction but passes over the inner surface of the shell in a curvilinear path as indicated by the lines C. As a result of this form of flow the film is not smooth and even but is agitated or turbulent thus increasing the percentage of the total volume of milk which is exposed at the surface of the film. I have found that this results in the production of about 50% more units of vitamin D than the old radial spill-over or weir type of distribution.

The source of ultra-violet rays may be an arc lamp, quartz tube or the like. The former is conventionally illustrated at 13. It is preferably suspended from a crane 14 so that its height may be varied or it may be withdrawn from the shell. A removable cover 15 is provided to prevent the entrance of extraneous matter. To add rigidity to the apparatus the upper edge of the shell 5 and wall 7 may be provided with reinforcing rings 16 and 17, respectively.

Having fully described my invention, what I claim as new and desire to secure by Letters Patent of the United States is:

1. The method of irradiating a liquid to modify its characteristics which consists in causing the liquid to flow in a thin film over a substantially vertical and cylindrical smooth unbroken surface in a curvilinear path, said flow resulting from a circular component of velocity imparted thereto in a horizontal plane and a vertical component due to gravity, whereby turbulence is caused in the film by the composite liquid movement alone independent of mechanical interruption, and subjecting the liquid during such flow to radiations of such character as to accomplish the desired modification thereof.

2. The method of irradiating milk to increase its antirachitic content which consists in causing the milk to flow in a thin film over a substantially vertical and cylindrical smooth unbroken surface in a curvilinear path, said flow resulting from a circular component of velocity imparted thereto in a horizontal plane and a vertical component due to gravity, whereby turbulence is caused in the film by the composite liquid movement alone independent of mechanical interruption, and subjecting the milk during such flow to the action of ultra-violet rays.

EDWARD S. BETTIS.